United States Patent [19]
Berry et al.

[11] Patent Number: 5,969,724
[45] Date of Patent: Oct. 19, 1999

[54] METHOD AND SYSTEM FOR NAVIGATING THROUGH OPAQUE STRUCTURES ON A DISPLAY

[75] Inventors: Richard Edmond Berry; Scott Harlan Isensee, both of Georgetown, Tex.; David John Roberts, Stockton, United Kingdom

[73] Assignee: International Business Machines Corporation, Armonk, N.Y.

[21] Appl. No.: 08/789,344

[22] Filed: Jan. 31, 1997

[51] Int. Cl.⁶ .................................................. G06T 17/00
[52] U.S. Cl. ............................................................ 345/429
[58] Field of Search .................................. 345/419, 440, 345/420, 423, 424, 429, 430

[56] References Cited

U.S. PATENT DOCUMENTS 5,261,044  11/1993  Dev et al. .
5,276,785  1/1994   Mackinlay et al. .
5,751,931  5/1998   Cox et al. ................................ 345/440

OTHER PUBLICATIONS

Mackinlay, Jock D.; Card, Stuart K.; Robertson, George G.; Rapid Controlled Movement Through a Virtual 3D Workspace, *Computer Graphics*, vol. 24, No. 4, Aug. 1990.

*Primary Examiner*—Phu K. Nguyen
*Assistant Examiner*—Cliff N. Vo
*Attorney, Agent, or Firm*—Sawyer & Associates; Volel Emile

[57] ABSTRACT

A method and system for navigating through an opaque structure via a user on a display in a computer system. The method and system comprises the steps of determining if the opaque structure is within a predetermined distance of the user and changing the opaque structure to a translucent structure when the user is within the predetermined distance of the opaque structure. Accordingly through the use of the method and system, a user can navigate more easily and efficiently through a display, particularly in three-dimensional environments associated with such a display without becoming disoriented.

8 Claims, 6 Drawing Sheets

METHOD AND SYSTEM FOR NAVIGATING THROUGH OPAQUE STRUCTURES ON A DISPLAY

CROSS-REFERENCE TO RELATED APPLICATIONS

The present application is related to application Ser. No. 08/789,338, filed Jan. 27, 1997, entitled "A Method and System for Providing Visual Hierarchy of Task Groups and Related Viewpoints of a Three-Dimensional Environment in a Display of a Computer System," application Ser. No. 08/789,343, filed Jan. 27, 1997, entitled "A Method and System for Classifying User Objects in a Three-Dimensional (3D) Environment on a Display in a Computer System," application Ser. No. 08/789,342, filed Jan. 27, 1997, entitled "A Method and System for Providing an Improved View of an Object in a Three Dimensional Environment on a Computer Display," application Ser. No. 08/789,345, filed Jan. 27, 1997, entitled "A Method and System for Providing Preferred Face Views of Objects in a Three-Dimensional (3D) Environment on a Display in a Computer System," and application Ser. No. 08/789,341, filed Jan. 27, 1997, entitled "A Method and System for Effectively Controlling an Object in a Three-Dimensional Environment in a Display of a Computer System," filed on the same date as the present application and assigned to the assignee of the present application.

TECHNICAL FIELD

The present invention relates generally to navigating in a three dimensional environment within a display in a computer system and more particularly relates to navigating through opaque structures in such a display.

BACKGROUND

Presently in a computer environment the screen or display on the computer has a plurality of icons and windows thereon. In a typical environment including a window and a pointing device, to access certain information it is important to point to and then click on a particular icon or window. Oftentimes, this type of environment is not efficient unless the user has a specific understanding of the particular nomenclature and syntax of the particular environment of the computer. Hence, a user that is not familiar with that syntax or nomenclature could become easily confused and spend a significant amount of time trying to understand how to navigate and access certain information. This can cause user frustration as well as create considerable inefficiency in the system.

In addition, it is known in computer games and the like that certain navigation techniques disorient the users. For example, when a user navigates in three dimensional (3D) spaces, such as found in computer games and in virtual reality worlds using virtual reality modeling language (VRML) on the Internet, the user can become disoriented. A major cause of disorientation occurs when the user moves close to a structure such as a wall which than fills the user's view. This is like a "white-out" effect because the user can see nothing except the structure. In another cause of the disorientation the user is "inside" of the structure and this can cause an undefined effect, such as a blurry screen or the like. Users typically become disoriented in either of these situations.

In addition, it is known that a computer game is not an environment where useful work is accomplished, such as in a business environment. Therefore, in a games environment obstacles like walls and the like would be there for reasons other than for productive office work.

Hence, what is desired is a system for enhancing the ease of use of the computer system. In addition, it is desirable to minimize the disorientation associated with navigating in three dimensional environments when encountering obstacles such as walls and the like. The system should be easy to use by a novice, should be straightforward and should be easily implemented in existing computer systems. The present invention addresses such a need.

SUMMARY

The present invention is a method and system for navigating through an opaque structure via a user on a display in a computer system. The method and system comprises the steps of determining if the opaque structure is within a predetermined distance of the user and changing the opaque structure to a translucent structure when the user is within the predetermined distance of the opaque structure.

Accordingly through the use of the present invention, a user can navigate more easily and efficiently through a display, particularly in three-dimensional environments associated with such a display.

DETAILED DESCRIPTION

The present invention relates to navigating in a three dimensional environment within a display on a computer system. The following description is presented to enable one of ordinary skill in the art to make and use the illustrative embodiment and is provided in the context of a patent application and its requirements. Various modifications to the illustrative embodiment will be readily apparent to those skilled in the art and the generic principles herein may be applied to other embodiments. Thus, the illustrative embodiment is not intended to be limited to the embodiment shown but is to be accorded the widest scope consistent with the principles and features described herein.

Figure 1:
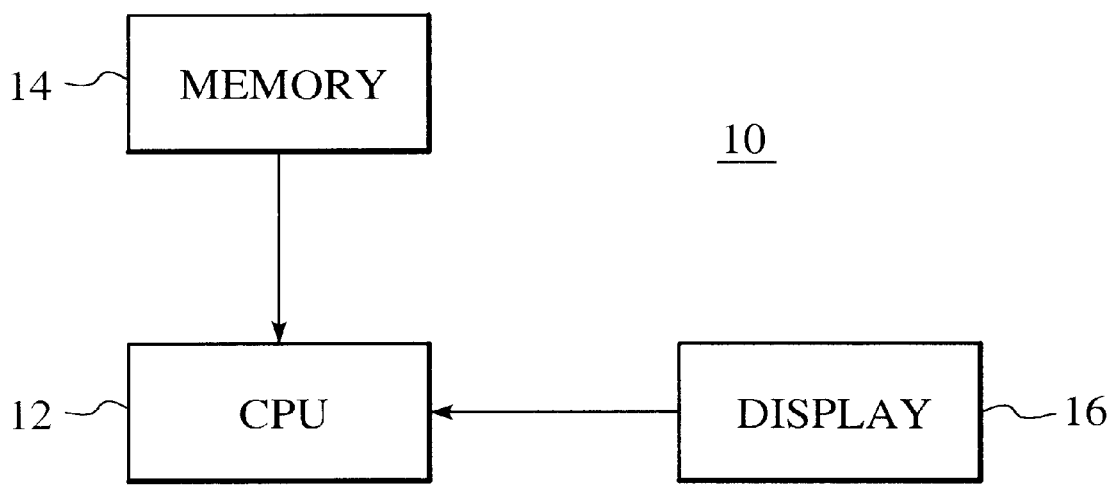
FIG. 1 is a block diagram of a computer system.
Figure 2:
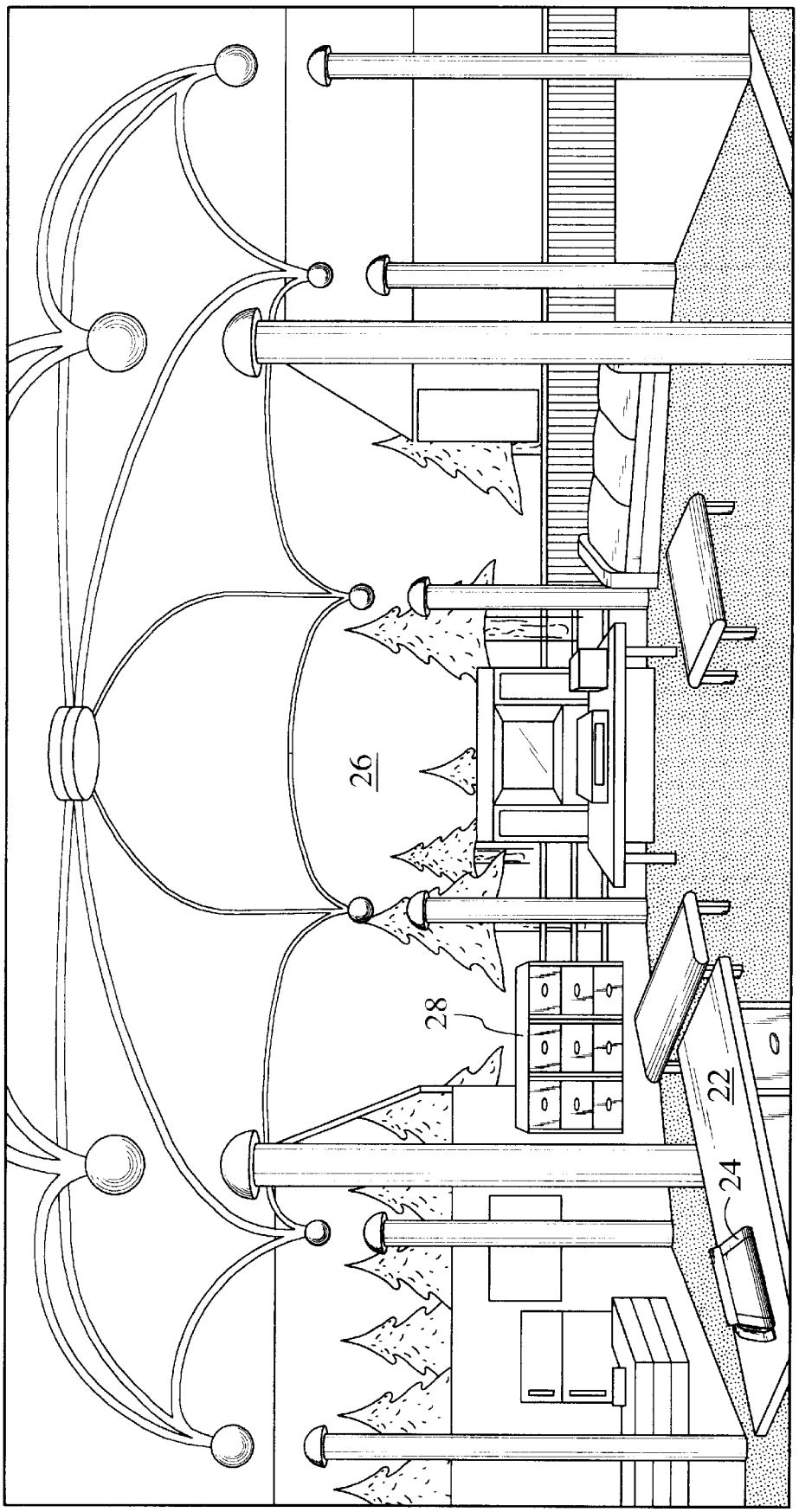
FIG. 2 is a three dimensional representation inside a home on a display of a computer system.

In the present invention, three dimensional ("3D") representations are utilized to show particular environments on a display 16 of a computer system 10 as shown in FIG. 1. For example, a home environment can be depicted on the display utilizing various 3D representations. Referring now to FIG. 2, what is shown is a 3D representation of a home 20 in which there is a desk 22, telephone 24, atrium 26, file cabinets 28, and other objects that make up the 3D representation. This 3D representation of certain of these objects can be containers for different information. For example, the desk 22 could include drawers, each of the drawers includes files, as in a typical office environment.

In a 3D environment in accordance with the present invention, a user viewpoint can navigate through the home in two ways. One way to navigate in the environment is for the user viewpoint to move through the home through the movement of the pointing (mouse, cursor or the like) device to simulate walking through the room. The other way to navigate in the environment is through providing certain events to facilitate user viewpoint movement from one point to another through the 3D environment.

Hence, to facilitate this second example, it is desirable to use these objects as containers in the appropriate fashion to provide the particular information. So, for example, using a pointing device such as a mouse or the like in a Windows environment, a desk could be pointed to and clicked on, the user viewpoint would then move closer to the desk, in a position where the drawers could be seen. A particular drawer could be clicked on and then opened, revealing a plurality of files. Thereafter, a particular file could be clicked on, and a representation of that file would be removed from the drawer and provided for access to the user viewpoint. Thereafter, the user could then click on the file and flip through the various documents in the file.

In another example, the telephone could be clicked on to bring the user viewpoint closer to the telephone. The user could then dial a number by using the keypad on the telephone to dial a particular number. In addition, there may be a fax facility on the telephone which could be used in which the computer system would then act as a fax machine. Accordingly, by using this 3D representation, using various objects in a 3D representation as containers rather than the typical Windows environment in which there are a plurality of windows and icons to be clicked on that may or may not be representative of the particular task that is to be performed, a system is provided in which it would be easier for a user to navigate and use in an expeditious and efficient manner.

This 3D representation allows for certain advantages while performing useful works. These advantages will be described below in conjunction with the accompanying figures.

Realism

Figure 3:
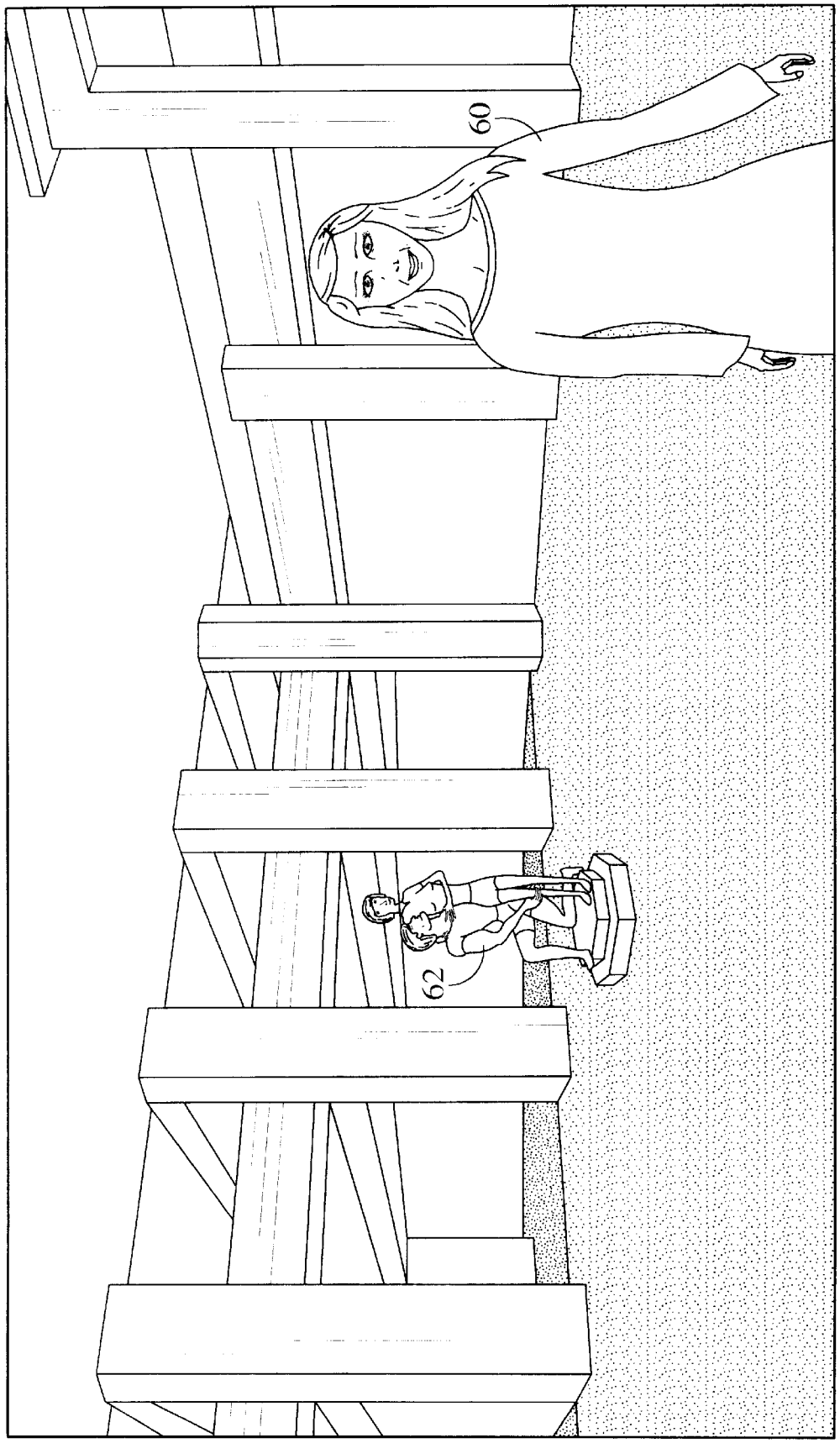
FIG. 3 shows a real world view and relationships between objects.

FIG. 3 shows a world view 32 and relationships between objects. Objects look and behave like real world counterparts. Realism aids recognition and understanding what an object is for. Realism is emphasized through visuals, interactions, and sound. Real world size and position relationships are preserved. As illustrated in FIG. 3, the world containing a person 60, and statue 62 is designed using real-world proportions and relationships, due this realism aspect.

As has been previously mentioned when navigating in certain 3D environments such as computer games and the like, disorientation occurs when contacting opaque structures. As has also been previously mentioned, it is known that a computer game is not an environment where useful work is accomplished, such as in a business environment. Therefore, in such an environment obstacles like walls and the like would be there for reasons other than for productive office work, for example, to organize and create spaces for doing tasks. A system and method in accordance with the present invention overcomes these problems.

In the present invention, user disorientation when passing through a opaque structure is avoided by making the structure, such as a wall, become translucent when the user is within a predetermined distance of the opaque structure. What is meant by translucent is allowing light to pass through but diffusing it so that objects on the other side can be seen but are not clearly distinguishable. When the user comes within a certain distance of the structure it becomes translucent. This allows the user to see through the structure, maintain visual context, and avoid becoming disoriented.

Making structures such as walls become translucent when the user moves close to them allows the user to maintain visual context while still understanding where the structure is. This helps the user to avoid disorientation. This technique is especially helpful when the user is allowed to "walk through walls" as a shortcut technique in navigating between two points.

Figure 4:
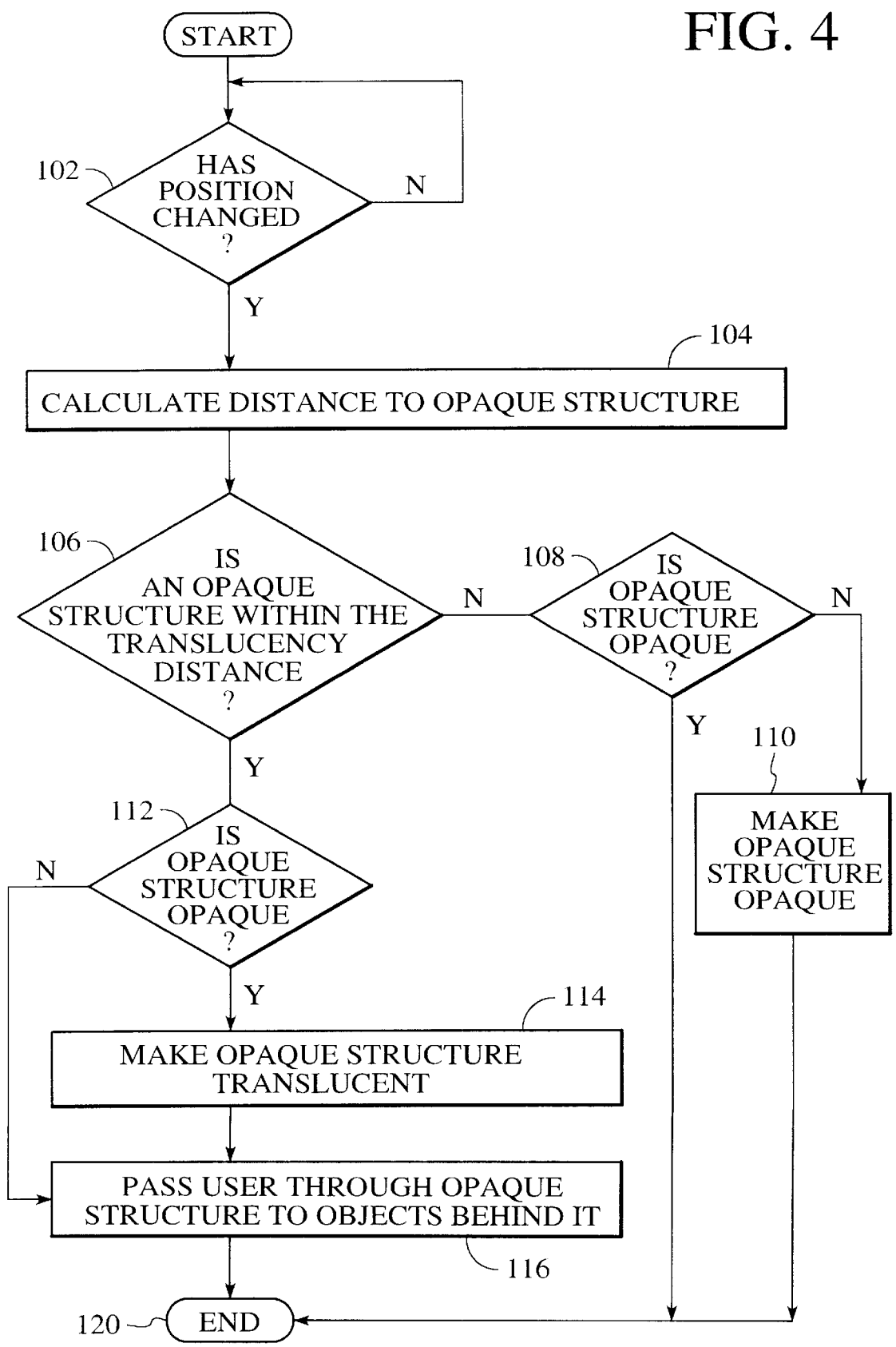
FIG. 4 is a flow chart showing a system for navigating through opaque structures in accordance with the present invention.

To more particularly describe the features of the present invention, refer now to FIG. 4. FIG. 4 is a flow chart showing a system for navigating through a translucent structure in accordance with the present invention.

Initially, a determination is made of whether the position has changed related to the translucent structure, via step 102. If it has not changed, then return to start. If it has changed, then the distance is calculated to the opaque structure, via step 104. Next, a determination is made whether the wall is within a particular distance within the translucency distance via step 106. If it is not within translucency distance, then a determination is made as to whether a wanl is opaque, via step 108. If the wall is not opaque, then the wall is made opaque, via step 110. Then the process is ended, via step 120. Referring back to step 106, if the wall is within the translucency distance, then a determination is whether the wall is opaque, via step 112. If the wall is not opaque, then the user can pass through the wall to objects behind it, via step 116. If the wall is opaque, then the wall is made to be translucent, via step 114. Thereafter the object can pass the user through the wall to objects behind it, via step 116. Thereafter the process is ended, via step 120.

Figure 5:
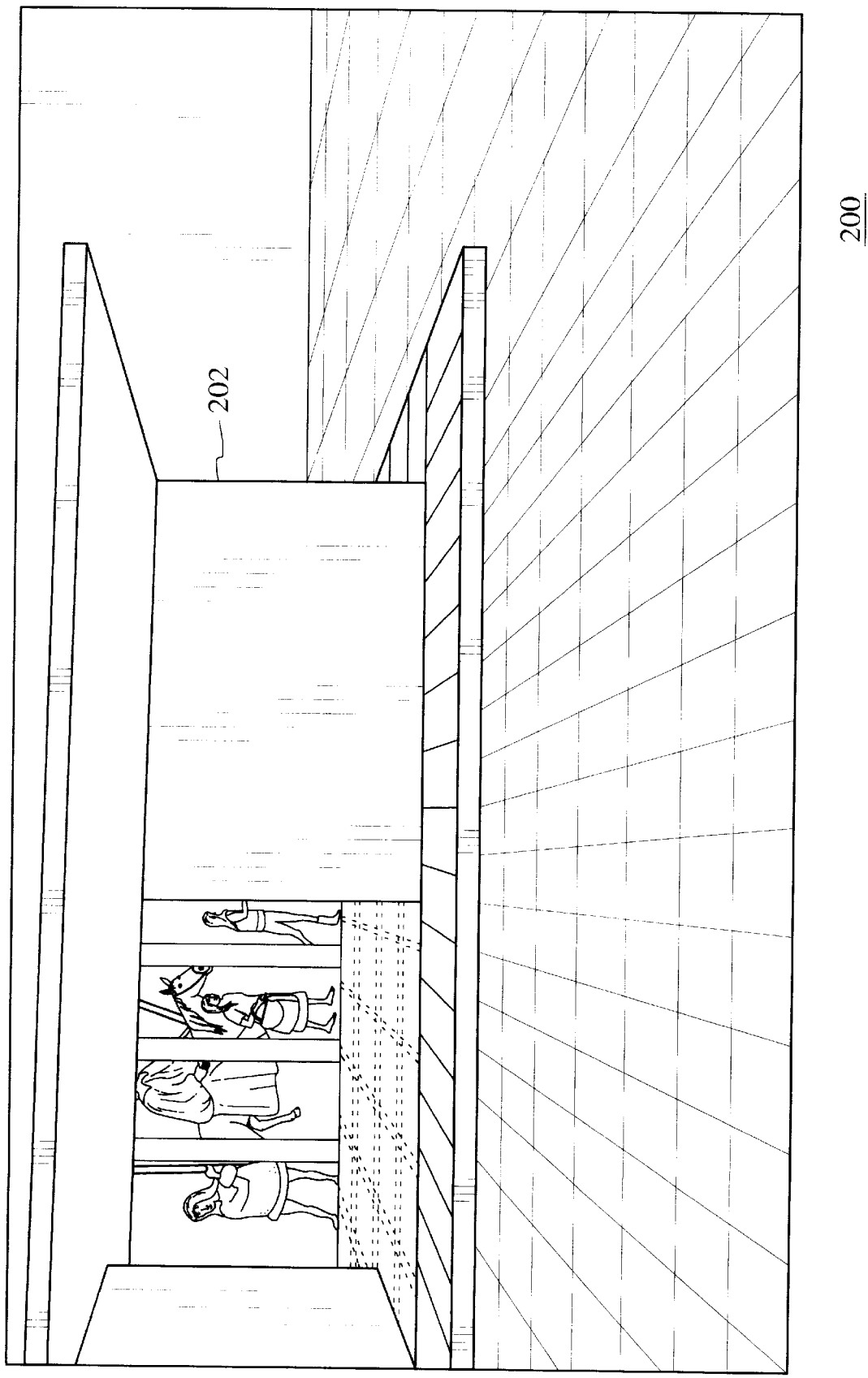
FIG. 5 is a representation of a wall when the user is outside of the translucency distance in a three dimensional environment.
Figure 6:
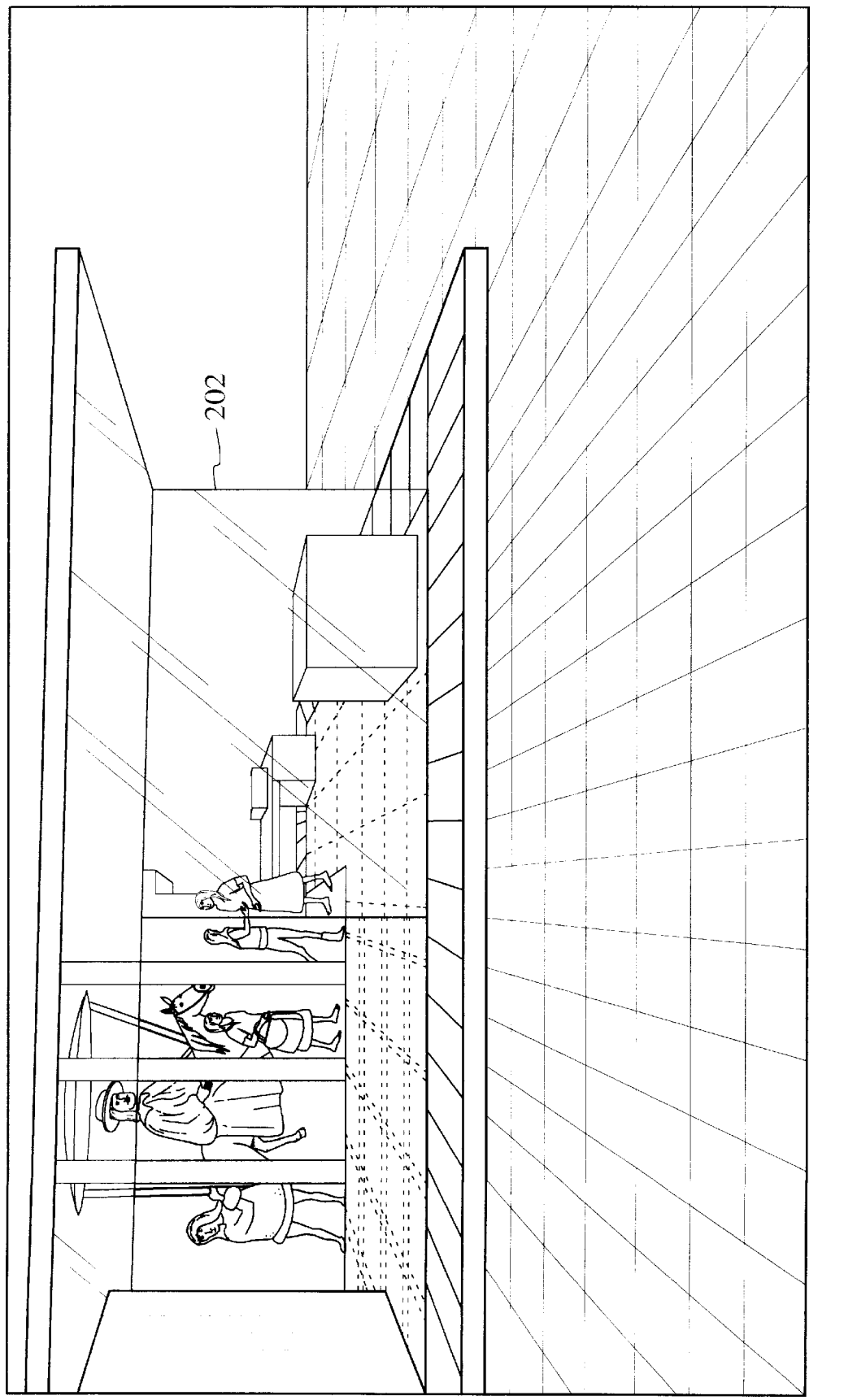
FIG. 6 is a representation of the wall of FIG. 3 when the user is within the translucency distance.

FIG. 5 is a representation of a wall 202 when the user is outside of the translucency distance in a three dimensional environment 200. As is seen the wall 202 is opaque. FIG. 6 is a representation of the wall 202 of FIG. 5 when the user is within the translucency distance. As is seen, the wall 202 becomes translucent.

Through the present invention, a user can navigate through translucent structures such as a wall or the like without being disoriented and in an efficient manner. Hence in the present invention there is no need to provide for doors or the like for one to go from one place to another. Hence, for example, if there is another room behind the wall, which would be for a 3D representation, the present invention could be used advantageously and quickly and efficiently maneuver through such an environment.

Although the system and method has been described in accordance with the embodiments shown, one of ordinary skill in the art will readily recognize that there could be variations to the embodiments and those variations would be within the spirit and scope of the above-described system and method. For example, although the present invention has been discussed in terms of navigating through walls, one of ordinary skill in the art would readily recognize that it is possible to navigate through other translucent structures, for example, it is possible to navigate into a container of some sort and actually view what is inside the container. The key feature being that translucent structure can be maneuvered through and it will be possible to determine what is on the other side of the structure. Accordingly, many modifications may be made by one of ordinary skill in the art without departing from the spirit and scope of the appended claims.

What is claimed is:

1. A method for navigating through an opaque structure in a three dimensional environment via a user on a display in a computer system comprising the steps of:

a) determining if the opaque structure is within a predetermined distance of the user; and b) changing the opaque structure to a translucent structure when the user is within the predetermined distance of the opaque structure.

2. The method of claim 1 in which the determining step (a) further comprises the steps of:

a1) determining if the position of the user has changed;

a2) calculating distance of the user to the opaque structure; and a3) determining if the opaque structure is within a translucency distance of the user.

3. The method of claim 2 wherein opaque structure comprises a wall.

4. The method of claim 1 which further comprises the step of passing the user through the translucent structure to objects behind the translucent structure.

5. A system for navigating through an opaque structure in a three dimensional environment via a user on a display in a computer system comprising:

means for determining if the opaque structure is within a predetermined distance of the user; and means for changing the opaque structure to a translucent structure when the user is within the predetermined distance of the opaque structure.

6. The system of claim 5 in which the determining means further comprises:

means for determining if the position of the user has changed;

means for calculating distance of the user to the opaque structure; and means for determining if the opaque structure is within a translucency distance of the user.

7. The system of claim 6 wherein the opaque structure comprises a wall.

8. The system of claim 5 which further comprises means for passing the user through the translucent structure to objects behind the translucent structure.

* * * * *